United States Patent Office 3,414,599
Patented Dec. 3, 1968

3,414,599
ORGANIC MERCURY COMPOUNDS AND
METHODS FOR THEIR PREPARATION
James D. Allen, Bartlesville, Okla., assignor to Phillips
Petroleum Company, a corporation of Delaware
No Drawing. Filed Nov. 24, 1965, Ser. No. 509,615
9 Claims. (Cl. 260—431)

ABSTRACT OF THE DISCLOSURE

Organomercury compounds are produced by simultaneously reacting a triolefin such as 1,2-bis(3-cyclohexene-1-yl)ethylene, with a mercuric salt of a carboxylic acid and an alcohol such as methanol.

---

This invention relates to novel organic mercury compounds. In one aspect this invention relates to the mercuration of 1,2-bis(3-cyclohexen-1-yl)-ethylenes wherein the reaction occurs at one or both of the cyclic olefinic double bonds, the ethylenic double bond remaining substantially intact. In another aspect this invention relates to novel organomercury derivatives of 1,2-bis(3-cyclohexen-1-yl)ethylenes.

In accordance with this invention, novel organomercury compounds having the formulas

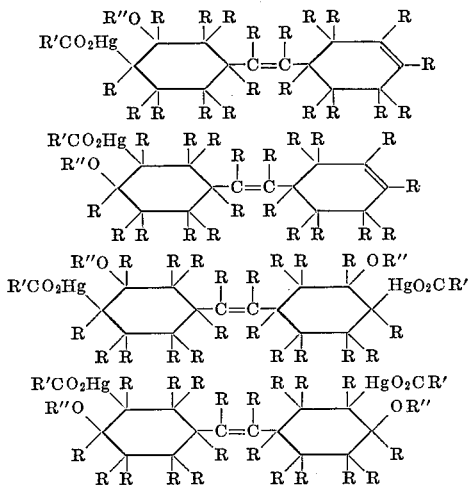

and

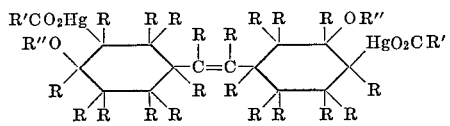

are prepared by the simultaneous reaction of a triolefin having the formula

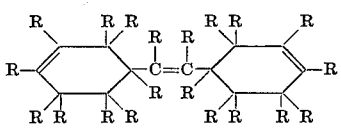

with a mercuric salt of a carboxylic acid, said salt having the formula (R′CO₂)₂Hg, and an alcohol having the formula R″OH, wherein R is selected from the group consisting of hydrogen, methyl and ethyl, the total number of carbon atoms in all of said R groups in the triolefin preferably not exceeding 8; R′ is selected from the group consisting of hydrogen, alkyl, cycloalkyl, and aryl, and combinations thereof such as alkaryl, aralkyl, and the like, preferably containing not more than 10 carbon atoms; and R″ is selected from the group consisting of alkyl, cycloalkyl, and aralkyl, and combinations thereof such as alkylcycloalkyl, alkylaralkyl, and the like, preferably containing not more than 10 carbon atoms.

Suitable examples of triolefin starting materials are as follows:

1,2-bis(3-cyclohexen-1-yl)ethylene
1,2-bis(1-methyl-3-cyclohexen-1-yl)ethylene
1,2-bis(2-methyl-3-cyclohexen-1-yl)ethylene
1,2-bis(3-ethyl-3-cyclohexen-1-yl)ethylene
1,2-bis(4-methyl-3-cyclohexen-1-yl)ethylene
1,2-bis(5-ethyl-3-cyclohexen-1-yl)ethylene
1,2-bis(6,6-dimethyl-3-cyclohexen-1-yl)ethylene
3,4-bis(3-cyclohexen-1-yl)-3-hexene
1,2-bis(2,6-dimethyl-3-cyclohexen-1-yl)ethylene
2,3-bis(3-methyl-3-cyclohexen-1-yl)-2-butene
1,2-bis(1,3-dimethyl-3-cyclohexen-1-yl)ethylene
2,3-bis(4-methyl-3-cyclohexen-1-yl)-2-butene
1,2-bis(1,4-dimethyl-3-cyclohexen-1-yl)ethylene
1,2-bis(5,6-dimethyl-3-cyclohexen-1-yl)ethylene
2,3-bis(1,3,4-trimethyl-3-cyclohexen-1-yl)-2-butene
1,2-bis(2,5,6-trimethyl-3-cyclohexen-1-yl)ethylene
1,2-bis(2,6-diethyl-3-cyclohexen-1-yl)ethylene
3,4-bis(4-ethyl-3-cyclohexen-1-yl)-3-hexene
1-(3-methyl-3-cyclohexen-1-yl)-2-(2-methyl-6-ethyl-3-cyclohexen-1-yl)ethylene
1-(3-cyclohexen-1-yl)-2-(2-methyl-3-cyclohexen-1-yl)ethylene Examples of mercuric salts of carboxylic acids applicable in the process of this invention are:

mercuric formate
mercuric acetate
mercuric propionate
mercuric isobutyrate
mercuric butyrate
mercuric hexanoate
mercuric 3,3-dimethylhexanoate
mercuric undecanoate
mercuric cyclohexanecarboxylate
mercuric 3-methylcyclopentanecarboxylate
mercuric benzoate
mercuric p-toluate
mercuric phenylacetate Alcohols suitable for employment in the process of this invention are as follows:

| | |
|---|---|
| methanol | 4-ethyl-1-hexanol |
| ethanol | 1-decanol |
| 1-propanol | cyclohexanol |
| 2-propanol | 3-methylcyclopentanol |
| 1-butanol | benzyl alcohol |
| 3-methyl-3-pentanol | o-methylbenzyl alcohol |

The ratio of the mercuric salt of the carboxylic acid to the triolefin can vary considerably, depending in large part on whether the product desired is that produced by reaction at one of the cyclic olefinic double bonds or that produced by reaction at both of the cyclic olefinic double bonds. When reaction at only one of the cyclic olefinic double bonds is desired, the mol ratio of mercuric salt to triolefin is preferably approximately 1:1; when the reaction at two of the cyclic olefinic double bonds is desired, the mol ratio of mercuric salt to triolefin is preferably about 2:1. The mol ratio of alcohol to mercuric salt should be at least 1:1, and preferably is at least 3:1, still larger amounts of the alcohol conveniently serving as a solvent in the presently preferred method of carrying out the process. If desired, an additional solvent which is nonreactive with any of the other components of the system can be present. Although the reaction temperature can vary over a considerable range, it will generally be within the range of about —20 to 100° C., usually being within the range of about 20 to 60° C. The reaction is generally carried out for a period of time sufficient to obtain a reaction mixture substantially free of mercuric ions, usually less than 24 hours. The reaction pressure need be only sufficient to prevent substantial gasification of components of the system, atmospheric pressure normally being used for the sake of convenience.

Specific examples of novel products formed according to the teaching of this invention are as follows:

1 - (3 - methoxy-4-acetoxymercuricyclohexyl)-2-(3-cyclohexen-1-yl)ethylene

1 - (3 - acetoxymercuri - 4-methoxycyclohexyl)-2-(3-cyclohexen-1-yl)ethylene 1,2-bis(3-methoxy-4-acetoxymercuricyclohexyl)ethylene 1,2-bis(3-acetoxymercuri-4-methoxycyclohexyl)ethylene 1 - (3 - methoxy - 4 - acetoxymercuricyclohexyl) - 2 - (3-acetoxymercuri-4-methoxycyclohexyl)ethylene 1 - (3 - methoxy - 4-formyloxymercuricyclohexyl)-2-(3-cyclohexen-1-yl)ethylene 1 - (1 - methyl - 3 - propionyloxymercuri-4-ethoxycyclohexyl)-2-(1-methyl-3-cyclohexen-1-yl)ethylene 1,2 - bis(2 - methyl-3-propoxy-4-isobutyryloxymercuricyclohexyl)ethylene 1,2 - bis(3 - ethyl-3-butyryloxymercuri-4-isopropoxycyclohexyl)ethylene 1 - (3 - butoxy-4-hexanoyloxymercuri-5-ethylcyclohexyl)-2 - (3-hexanoyloxymercuri-4-butoxy-5-ethylcyclohexyl)ethylene 1 - [2,2 - dimethyl-4-(3,3-dimethylhexanoyloxymercuri)-5 - tert - pentyloxycyclohexyl]-2-(6,6-dimethyl-3-cyclohexen-1-yl)ethylene 1 - [2,6 - dimethyl-3-cyclohexylcarbonyloxymercuri-4-(4-ethylhexyloxy)-cyclohexyl] - 2 - (2,6-dimethyl-3-cyclohexen-1-yl)ethylene 3,4 - bis(3 - decyloxy-4-ethyl-4-undecanoyloxymercuricyclohexyl)-3-hexene 2,3 - bis[3 - (3-methylcyclopentylcarbonyloxymercuri)-4-methyl-4-cyclohexyloxycyclohexyl]-2-butene 1 - [2,3-dimethyl-4-benzoyloxymercuri-5-(3-methylcyclopentyloxy)cyclohexyl] - 2 - [2,3-dimethyl-4-(3-methylcyclopentyloxy) - 5 - benzoyloxymercuricyclohexyl]ethylene 1 - (3 - methyl - 3-benzyloxy-4-p-toluoyloxymercuricyclohexyl)-2-(2-methyl-6-ethyl-3-cyclohexen-1-yl)ethylene 1 - (3 - phenylacetoxymercuri-4-o-methylbenzyloxycyclohexyl)-2-(2-methyl-3-cyclohexen-1-yl)ethylene It is to be understood that the ethylenic group,

in these products retains the geometric configuration which it possessed in the starting triolefin. Thus, when the ethylenic group has the trans configuration in the starting triolefin, it will have the trans configuration in the product; and when it has the cis configuration in the starting triolefin, it will have the cis configuration in the product.

In the following example, the invention is illustrated in greater detail with reference to an exemplary representative embodiment thereof. It is to be understood, however, that this example is presented solely by way of illustration and not by way of limitation.

EXAMPLE

A mixture of isomeric mono-addition products comprising trans-1-(3-methoxy-4-acetoxymercuricyclohexyl)-2-(3-cyclohexen - 1 - yl)ethylene and trans-1-(3-acetoxymercuri - 4 - methoxycyclohexyl)-2-(3-cyclohexen-1-yl)-ethylene and isomeric di-addition products comprising trans - 1,2 - bis(3-methoxy-4-acetoxymercuricyclohexyl)-ethylene, trans-1,2-bis(3-acetoxymercuri-4-methoxycyclohexyl)ethylene, and trans - 1-(3-methoxy-4-acetoxymercuricyclohexyl) - 2 - (3-acetoxymercuri-4-methoxycyclohexyl)ethylene was prepared by the reaction of trans-1,2-bis(3-cyclohexen-1-yl)ethylene with mercuric acetate in methanol. To 32 g. (0.1 mol) of mercuric acetate suspended in 100 ml. of methanol was rapidly added 9.9 g. (0.05 mol) of trans-1,2-bis(3-cyclohexen-1-yl)ethylene. The mixture, which quickly became homogeneous, was stirred at room temperature for 20 hours. One-half of the reaction mixture was then stirred into 200 ml. of water containing 10 g. of sodium chloride. A white precipitate formed immediately. The precipitate was collected and washed with water and a small amount of pentane. The precipitate was then dissolved in an acetone-methanol solution, and the mixture was filtered through magnesium sulfate to aid in the removal of water. After removal of the solvents, the residual solid was dried through the use of phosphorus pentoxide. The resulting white powder weighed 12 g., representing a 60 mol percent yield, calculated as a mixture of the three isomeric di-addition products ($C_{20}H_{32}Hg_2O_6$) named above and based on the trans-1,2-bis(3-cyclohexen-1-yl)ethylene employed.

*Analysis.*—Calculated for $C_{20}H_{32}Hg_2O_6$: C, 31.2; H, 4.2; O, 12.5; mol. wt., 770. Found: C, 31.2; H, 4.3; O, 10.3; mol. wt., 708.

The nuclear magnetic resonance spectrum was consistent with that to be expected for a mixture of the three isomeric di-addition products, but indicated the presence of approximately 10 weight percent mono-addition products which would be formed by reaction at only one of the cyclic olefinic double bonds. However, based on the analysis for carbon and the degree of precision associated with the analysis for carbon, the concentration of the two isomeric mono-addition products probably was somewhat less than 10 weight percent.

The products of this invention are isolated from the reaction mixture by conventional techniques such as solvent extraction, crystallization, and the like. The products of the present invention have utility as germicides, fungicides, and the like. They are especially useful as a starting material for the preparation of other organic mercurials which are especially useful as diuretics.

Obviously many modifications and variations of the present invention are possible in the light of the above teachings. It is therefore to be understood that within the scope of the appended claims the invention may be practiced otherwise than as specifically described herein.

What is claimed is:

1. A method for synthesizing novel organomercury compounds characterized by the following formulas

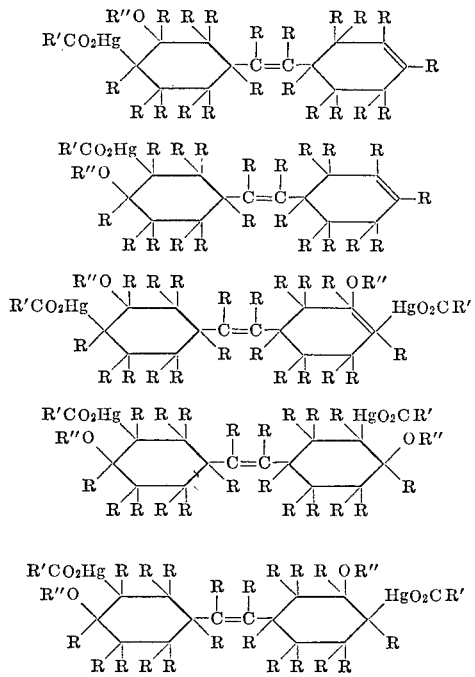

and said method comprising the step of simultaneously reacting a triolefin characterized by the following formula

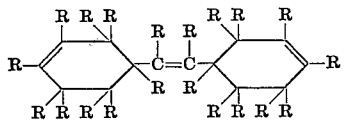

with a mercuric salt of a carboxylic acid characterized by the following formula $(R'CO_2)_2Hg$ and an alcohol characterized by the following formula $R''OH$ where R″ is selected from the group consisting of alkyl, cycloalkyl, and aralkyl, and combinations thereof, containing not more than 10 carbon atoms, wherein reaction occurs at one or both of the cyclic olefinic double bonds; wherein R is selected from the group consisting of hydrogen, methyl and ethyl, the total number of carbon atoms in all of said R groups in the triolefin not exceeding 8; and wherein R′ is selected from the group consisting of hydrogen, alkyl, cycloalkyl, and aryl, and combinations thereof such as alkaryl, aralkyl, and the like, containing not more than 10 carbon atoms.

2. A process according to claim 1 wherein the mol ratio of mercuric salt to triolefin is within the range of approximately 1:1 to 2:1 and the mol ratio of alcohol to mercuric salt is at least 1:1 and the reaction is carried out at a temperature in the range of about −20° C. to 100° C.

3. A process according to claim 2 characterized in that the triolefin starting material is 1,2-bis(3-cyclohexen-1-yl)ethylene, the mercuric salt is mercuric acetate and the alcohol is methanol.

4. Novel organic mercury compounds being characterized by one of the following formulas:

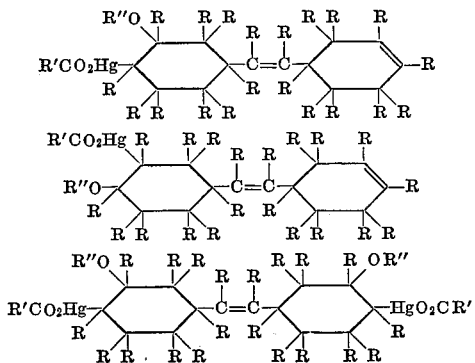

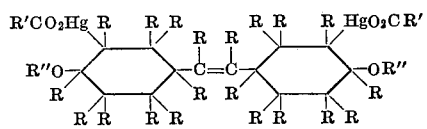

and

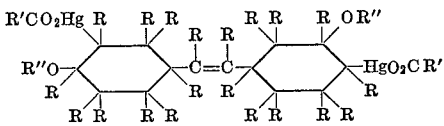

wherein R is selected from the group consisting of hydrogen, methyl and ethyl, the total number of carbon atoms in all of said R groups in the triolefin preferably not exceeding 8; R′ is selected from the group consisting of hydrogen, alkyl, cycloalkyl, aryl, and combinations thereof such as alkaryl, aralkyl, alkylcycloalkyl and alkylaralkyl, containing not more than 10 carbon atoms; and R″ is selected from the group consisting of alkyl, cycloalkyl, and aralkyl and combinations thereof such as alkylcycloalkyl and alkylaralkyl, containing not more than 10 carbon atoms.

5. A compound as defined in claim 4, 1-(3-methoxy-4 - acetoxymercuricyclohexyl) - 2 - (3-cyclohexen-1-yl)ethylene.

6. A compound as defined in claim 4, (1-(3-acetoxymercury - 4 - methoxy-cyclohexyl)-2-(3-cyclohexen-1-yl)ethylene.

7. A compound as defined in claim 4, 1,2-bis(3-methoxy-4-acetoxy-mercuricyclohexyl)ethylene.

8. A compound as defined in claim 4, 1,2-bis(3-acetoxymercury-4-methoxycyclohexyl)ethylene.

9. A compound as defined in claim 4, 1-(3-methoxy-4 - acetoxymercuri-cyclohexyl) - 2 - (3-acetoxymercuri-4-methoxycyclohexyl)ethylene.

References Cited
UNITED STATES PATENTS

| 2,284,067 | 5/1942 | Ralston | 260—431 |
| 2,289,590 | 7/1942 | Ralston | 260—431 |
| 2,356,884 | 8/1944 | Ralston | 260—431 |
| 2,460,708 | 2/1949 | Mozingo | 260—431 XR |
| 2,636,045 | 4/1953 | Halpern | 260—431 |
| 3,184,491 | 5/1965 | Lafont et al. | 260—431 |

TOBIAS E. LEVOW, *Primary Examiner.*

H. M. S. SNEED, *Assistant Examiner.*